Figure 1:
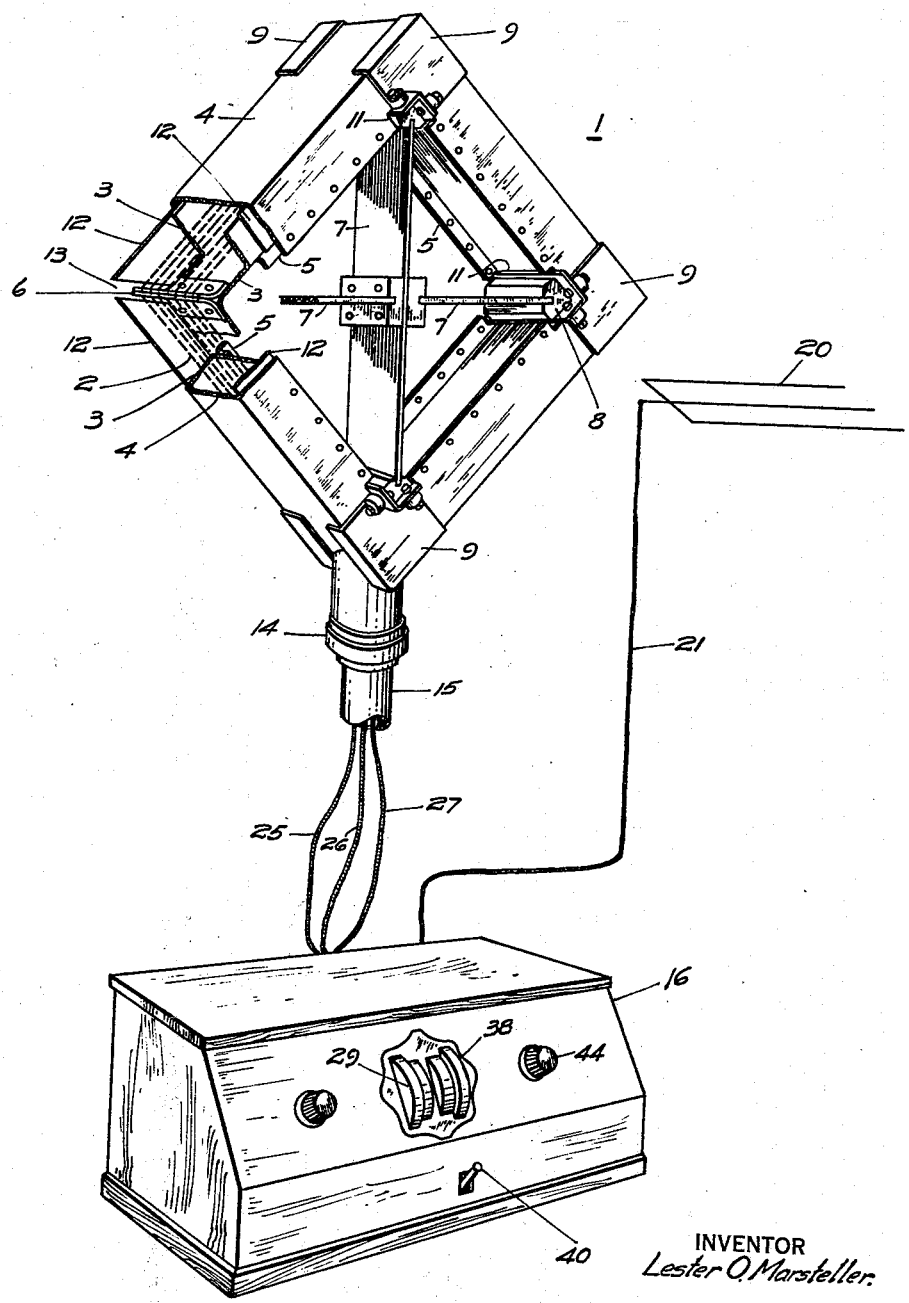

Sept. 13, 1932.                L. O. MARSTELLER                1,877,346
                                 SHIELDED LOOP
                            Filed Feb. 4, 1928        2 Sheets-Sheet 2

INVENTOR
Lester O. Marsteller
BY
ATTORNEY

Patented Sept. 13, 1932

1,877,346

UNITED STATES PATENT OFFICE

LESTER O. MARSTELLER, OF IRWIN, PENNSYLVANIA, ASSIGNOR TO WESTINGHOUSE ELECTRIC & MANUFACTURING COMPANY, A CORPORATION OF PENNSYLVANIA

SHIELDED LOOP

Application filed February 4, 1928. Serial No. 251,851.

This invention relates to radio reception, and more particularly to receiving devices which are intended to determine the direction from which the received signal comes.

A loop antenna is more receptive to signals which arrive from a direction in the plane of the loop than to signals from other directions. Theoretically, such an antenna will not respond at all if the signals come from directions at right angles to the plane of the loop. The theoretical diagram representing the response to signals from different directions is a figure 8 made of two circles tangent to each other. The maximum change of response with change of direction is at the point where the two circles are tangent.

This is the reason why it is the practice to obtain the direction by setting the loop to the position which gives minimum response.

Although the response may become a minimum, it will not, with the loops heretofore used, ordinarily become zero, because, superposed upon the directional effect of the loop, represented by the figure 8 diagram, there is a non-directional effect usually known as the "antenna effect." The theoretical diagram corresponding to this effect is a circle, and the super-position of the circle upon the figure 8 diagram leaves no zero point but only two places of minimum response.

This so-called antenna effect is largely the result of the action of the vertical wires from the loop to the receiving set. If these wires were completely shielded from the signal, the antenna effect would be very substantially diminished. Frequently, an antenna effect is purposely introduced, either by an extra loop or by a non-directional antenna.

A certain amount of antenna effect is desirable because it may be combined with the loop effect to obtain an indication of the sense of the direction of the signal. The loop effect alone will give only the line of the direction, without indicating the sense. Thus, the setting of the loop alone may show that the direction is on the line between north-east and south-west but will not show whether the signal is traveling from or toward the north-east. By properly combining the antenna effect with the loop effect it is possible to determine the sense of the travel of the signal, that is, in the illustration chosen, whether the signal comes from the north-east or from the south-west.

For the purpose of obtaining an indication of the sense, it is necessary to reverse the antenna effect relative to the loop effect. This cannot be done when the antenna effect and the loop effect are both obtained from one system of receiving wires.

Signals which arrive in directions in the plane of the loop produce the maximum effect therein. If all signals, except these, can be prevented from producing any result in the loop, a greater certainty in the determination of the line of the direction from which the signal arrives will result.

It is an object of my invention to provide means for shielding the loop from signals which arrive from any direction except those in the plane of the loop.

It is a further object of my invention to provide shielding means which have a directional characteristic.

It is a further object of my invention to mechanically associate the shielding means and the loop, whereby they will rotate together, and the directional effects of loop and of the shield will have a constant directional relation.

It is a further object of my invention to provide a shield of minimum weight, maximum effectiveness and great directive effect.

It is a further object of my invention to so position the shield relative to the winding of the loop that the capacity effect between them shall produce no objectionable diminution of the tuning range.

It is a further object of my invention to so select the position of the shield relative to the winding that the capacity effect between them shall not render the set unstable.

It is a further object of my invention to provide an antenna, distinct from the loop, and to so separate the antenna lead-in from the loop lead-in that the antenna effect in the loop and its lead-in shall not be increased by the effect of the antenna lead-in.

It is a further object of my invention to provide a convenient switching and adjusting means whereby, when the loop is being used to determine the line of the direction, the system shall have maximum sensitiveness and when the loop and antenna are being used together for determination of the sense of said direction, the combination of the two shall be most effective.

Figure 2:
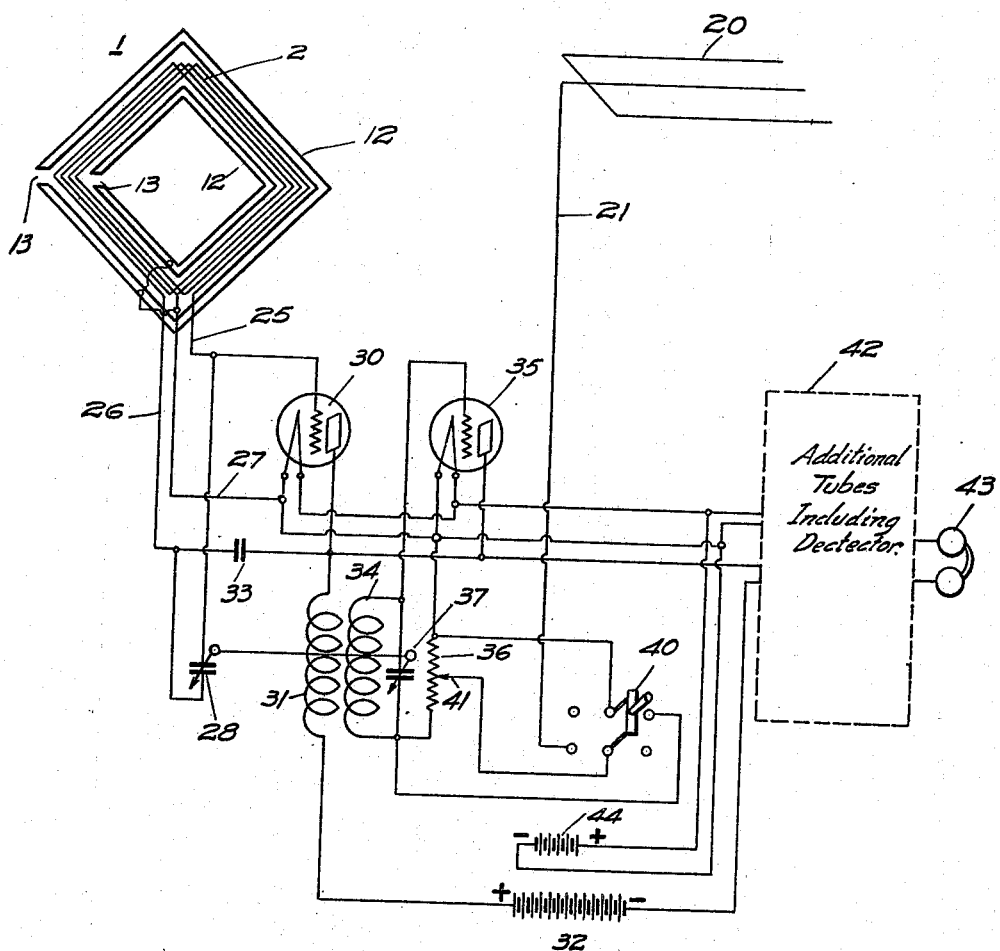

Other objects of my invention and details of the construction will be apparent from the following description and the accompanying drawings, in which Figure 1 is a view, partly diagrammatic and partly in perspective, of an apparatus constructed according to my invention; and Fig. 2 is a diagram of the circuits and apparatus.

A loop 1 is provided which constitutes a directional antenna. The loop includes a winding 2 supported within a micarta housing comprising an inner channel member 3 and an outer channel member 4 telescoping therewith. The channel members are secured together by means of micarta angle bars 5 riveted to each member. The winding is supported by means of micarta brackets 6, one at each corner of the loop, mounted at the junction of each pair of adjacent lengths of the inner channel member 3. Preferably, the brackets 6 are provided at their outer edges with notches to definitely position the individual turns of the winding.

The housing, composed of the micarta channel members, is supported by diagonal members 7 which are provided, at each end, with blocks 8 to set into the corners of the loop housing and to which the housing may be secured in any desired way. The several lengths of housing are fastened together, at the corners of the loop, by means of metal caps 9 provided with lugs. Bolts, extending through the lugs and through angle members 11 on the inside of the loop, secure the channel members between said angle members and flanges on the outside edges of the caps.

Within the housing, held in place between the inner channel 3 and the outer channel 4, lengths 12 of copper are provided. At each corner of the loop, except one, these lengths are soldered together. They thus form two polygonal strips each of which has the form of the outline of the loop. There is one strip on each face of the loop and each strip comprises as many lengths as the loop has sides. The lengths stand with their widths at right angles to the plane of the wires of the respective sides of the loop and extend past such plane in both directions, that is, the winding is approximately mid-way between the outer and the inner edges of the metal strips.

At one corner of the loop, the outline formed by a copper strip is interrupted by a gap, as shown at 13. The gap in the other strip may be at the same or at a different corner. The loop, housing, frame and strips are all mechanically united together and mounted in any desired way to rotate, as indicated by the bearing 14.

Preferably, the rotational mounting includes a hollow metallic mast or vertical pipe 15 through which the lead-in wires from the loop extend to a plug at the back of the receiving set 16. The mast or pipe 15 is preferably long enough to enable the wires to move with the rotation of the loop without becoming twisted enough to cause likelihood of their breaking. On the other hand, the wires are made as short as possible and provide for this motion. Excessive twisting may be avoided by providing a stop to prevent rotation of the loop through several turns.

The antenna 20 is represented in a conventional manner. It may be any form of elevated capacity and includes a lead-in wire 21 which is connected to the receiving set, preferably through a different plug. The wire 21 is outside of the pipe or mast 15 and is connected to the receiving set at a point which is distinct from the place at which the wires from the loop are connected, although, if desired, the lead-in wires may all enter the case through one plug.

The wires inside the pipe 15 include a lead 25, best shown in Fig. 2, from one end of the winding of the loop, a lead 26 from the other end of the winding and a lead 27 from the mid-point of said winding. The copper strips 12 are connected in any suitable way, for example, by soldered lugs, to each other and to the lead-in wire 27. Between the lead-in wires 25 and 26 an adjustable condenser 28 is connected, which is manipulated by means of the drum 29 on the front of the receiving set 16.

The wires 25 and 27 are connected, respectively, to the grid and the filament of a vacuum-tube amplifier 30. The plate of said amplifier is connected, through the primary 31 of a transformer, to the usual B battery 32. The plate is also connected, through a neutralizing condenser 33, to the wire 26.

The secondary 34 of the transformer is connected to the grid and filament of a second vacuum-tube amplifier 35. The connection includes a resistor 36. The secondary is tuned by means of an adjustable condenser 37 which is manipulated by the same drum 29 on the outside of the receiving set. The rotors of the two condensers 28 and 37 are mechanically connected to each other in order that they may be operated by the one control drum.

The antenna 20 is connected to one terminal of a switch 40. When this switch is in circuit-closing position for this terminal, the antenna is connected therethrough to an adjustable contact 41 on the resistor 36. The antenna is thereby connected to an intermediate point of the grid-filament circuit of the amplifier 35.

The output circuit of the amplifier 35 is connected to the next tube of a receiving set. The receiving set includes the tubes 30 and 35 and whatever additional tubes are necessary. Among the additional tubes will be at least one detector. The arrangement of the tubes constitutes no feature of my invention and, consequently, it is shown only diagrammatically by the rectangle 42.

In the preferred form of my device, the additional tubes, indicated by the rectangle 42, also include an oscillator tube for heterodyning. The frequency generated by the oscillating tube is controlled by an adjustable condenser manipulated from the outside of the set by means of the drum 38. The signals from the receiving set are heard in the telephones 43. The filaments of the tubes 30 and 35 and of other tubes in the receiving set are energized from the A battery 44 and the plate circuits of the receiving set are supplied from the B battery 32.

When the switch 40 is in the right-hand position, a connection is established thereby from one end of the resistor 36 to the other. The resistance thereof is thus removed from the input circuit of the amplifier 35.

In the operation of the device, radio waves carrying signals impinge upon the loop 1. If these waves are exactly in the plane of the loop they meet the sheet-metal strips 12 edgewise. Consider the loop in a vertical, north-and-south plane and a signal from a station situated to the north of the loop. The electrostatic component of the signal wave is then vertical. It gives rise to a current in the same direction in both sides of the loop and thus tends to produce no resultant electromotive force around the loop. The width of the loop is so small, compared to the wave-length of the signal, that the difference of the effects in the two sides of the loop may be neglected.

The electromagnetic component of the signal wave, on the other hand, is, under the circumstances stated, in a horizontal east-and-west direction. It, therefore, produces a change of flux through the loop and so gives rise to an electromotive force around the loop. It also gives rise to an electromotive force around each of the two copper frames constituting the shield.

The electromotive force around the loop gives rise to a current through the condenser 28 but, because of the opening 13 in each frame, no current around the frame results. The capacity between adjacent edges of the copper strip at 13 is too small to pass any substantial current. If, instead of the two strips, one on each face of the loop, a copper pipe enclosing the winding extended around the loop except for a single circular crack at the ends of the pipe, the capacity across the crack would be much larger than that across the openings 13. Such a pipe would, therefore, cause a much greater diminution of the signal than the strips cause.

The electromagnetic component of the signal wave, under the assumed circumstances, is a changing magnetic field at right angles to the plane of the copper strips. It, therefore, gives rise to eddy currents in the strips which do not require for their circulation that each of the copper frames shall form a closed circuit. Some of the energy of the signal wave which would otherwise be expended in producing current in the loop is, therefore, absorbed in the copper shields.

If, with the signal in the same direction as before, the loop be turned about a vertical axis, so that it now stands in an east-and-west plane, the electromagnetic field which constitutes one component of the signal wave would now be parallel to the surface of the copper strips and would, therefore, cause substantially no eddy currents.

This is the position in which the loop should give zero response to the signal. Any diminution of the response which results from an action of the shield ought to be avoided when the loop is to be placed in position of zero response, because it is then necessary that any effect which results from a slight difference between the actual position and the position of zero response shall be as readily observed as possible.

Consequently, the shield comprising the two copper frames 12 assists in obtaining more accurate settings for zero response.

The signal waves cause currents in the winding 2 and, consequently, voltages are impressed upon the grid-filament circuit of the tube 30. The condenser 28 cooperates with the inductance of the winding 2 to form a resonant circuit for the frequency of the signal waves, and the reception through the tube 30 is thus rendered sensitive.

The capacity between a strip 12 and the neighboring turns of the winding 2, in series with the capacity between the other strip 12 and the turns of the winding 2 nearest it, constitutes a capacity in parallel with the condenser 28. This somewhat increases the minimum capacity to which the adjustment may be made by the drum 29. The range over which the loop may be tuned is diminished by this increase of the minimum capacity. The distance between the copper strips 12 and the wire 2 must be so chosen that this effect upon the tuning range is not objectionably large.

Moreover, if the capacity between either half of the shield 12 and the winding 2 differs much from that of the other half it tends to cause the tube 30 to set up oscillations. It has been found that, for each wave length, there is a best position of the shield and, for each range of wave length, a compromise position must be adopted.

When the signal waves arrive from any other direction than that of the plane of the loop, the strips 12 act as a shield. The energy of the waves is absorbed as eddy currents in the sheet metal and does not reach the winding 2. For directions at right angles to the plane of the loop, the shielding action of the two strips of sheet metal is a maximum.

There is no abrupt change from shielding effect to non-shielding effect of the strips 12 as the angle changes. The directional diagram of the shielded loop is a figure 8, but the two members of it, instead of being circles, will be elipses tangent to each other at the ends of the minor axes. If such diagram be compared with the two circles, it is easy to understand that a very small change in the angle between the loop and the signal produces a larger departure from the minimum signal in the case of the shielded loop than in the case of the ordinary loop.

Signals which impinge upon the antenna 20 produce substantially the same effect from whatever direction they arrive. If the switch 40 is in the left-hand position, these signals are impressed upon the input circuit of the tube 35. The extent to which they affect this circuit is controlled by adjusting the position of the contact member 41.

This may be controlled by the knob 44 on the outside of the receiving set.

If the adjustment be properly chosen, the energy in the circuit 34—37 from the antenna 20 and the energy therein from the tube 30, which is controlled by the loop 1, will be equal. Then, if the phase of these two currents is opposite, the sound in the telephone 43 will be a minimum. On the other hand, if these two are in phase with each other, a maximum signal will be heard in the telephones.

The change in phase from coincidence to opposition can be accomplished by rotating the loop 1 through 180°.

In using the apparatus, the operator will first place the switch 40 to the right in Fig. 2, which corresponds to the upper position in Fig. 1. He will then rotate the loop 1 until he obtains a minimum signal. During this operation, the resistance of the rheostat 36 is shunted out of the grid circuit of the tube 35. The amplification is, therefore, most effective and best suited for determining the position of the loop 1 which will give minimum signal.

Having found in this way the line of the direction of the arriving signals, the operator moves the switch 40 to the left. He then rotates the loop through 90° to bring it into a position of maximum signal. He notes the signal intensity and then rotates the loop through 180° and notices whether there is any difference in intensity of the signals in the two positions. He next moves the handle 44, which adjusts the contact 41, and again reverses the loop. A few trials will enable him to find a position for the contact 41 in which the difference in the signal strength which occurs upon rotating the loop 180° is readily observed.

He is then able to learn the sense of the direction of the signal because that edge of the loop 1 which will yield a signal in phase with the signal in the antenna 21, when directed toward the arriving signal, is made to correspond to an identifying mark upon the pointer mechanically connected with the loop. The direction of the marked end of the pointer, when the maximum signal is received, with the switch 40 in the left-hand position, indicates the direction from which the signal arrives.

It will thus be clear that the apparatus affords a means for more accurately obtaining the line of direction of the signal and then quickly and conveniently obtaining the sense of the direction.

Although I have described the insulating parts of the loop support and loop housing as being of micarta, other insulating material in which the high-frequency losses are not too great, may be used. I have described the shield 12 as of copper; it will, however, be evident that any conductor will serve for a shield. It is quite possible to use, instead of a separate piece of metal, a plating of copper or other metal electrolytically disposed upon the micarta housing. Moreover, many of the parts herein described as of insulation may be made of metal, although insulation is preferred in the parts thus described. The angle bars 5 are an illustration of this. These bars may be made of metal instead of insulation although better results are obtained if insulation is used.

Although I have specifically described and illustrated only a single form of my invention, it will be clear to those skilled in the art that many modifications may be made without departing from the spirit thereof. I, therefore, do not intend to be limited except as required by the prior art and indicated in the claims.

I claim as my invention:

1. In a radio compass, a directive antenna, a non-directive antenna, an amplifier having its input connected to said directive antenna, a second amplifier, means for combining the energy delivered from the output of said first-named amplifier with energy received from said non-directive antenna and impressing the combined energy upon said second amplifier, and means associated with said second amplifier for adjusting the amount of energy received from said non-directive antenna.

2. In a radio compass, a directive antenna, a non-directive antenna, an amplifier having its input connected to said directive antenna, a second amplifier, means for combining the energy delivered from the output of said first-named amplifier with energy received from said non-directive antenna and impressing the combined energy upon said second amplifier, means for adjusting the amount of energy received from said non-directive antenna, and switching means for, at will, preventing the delivery of energy from said non-directive antenna to said combining means.

3. In a radio receiving system, a non-directive antenna, a vacuum-tube amplifier, a resistor in the input circuit thereof, a directive antenna connected to said input circuit, and a switch, in one position, connecting said non-directive antenna to an adjustable point of said resistor and, in another position, establishing a shunt about said resistor.

4. In a radio compass, a loop antenna having substantially parallel faces, a shield on each face of said loop parallel thereto, each shield comprising an open strip having a contour like that of the loop, said loop being unshielded between said shields.

5. In a radio compass a loop mounted for rotation about a vertical axis and shielding means mounted to rotate with said loop, said shielding means including spaced parallel portions so positioned relative to the loop that they tend to exclude signals from all directions except those to which the loop is most receptive.

6. In a radio compass, a loop comprising a winding and a tuning device, spaced shields, one on each face of said loop comprising a metal member positioned as close to the winding of the loop as possible without materially decreasing the tuning range.

7. In a radio compass, a loop comprising a winding having a plurality of turns, a shield on each face of the loop, each shield comprising a sheet of metal constituting a strip in a plane perpendicular to the surface of the winding and forming an outline having the contour of the loop and open at least one point.

8. In a radio compass, a winding comprising a plurality of turns, supporting means for positioning said turns, shielding means carried by said supporting means and comprising two strips of sheet metal parallel to the turns and on opposite edges of said winding, respectively, each strip forming an outline corresponding to the contour of the loop.

9. In a radio compass, a winding comprising a plurality of turns, supporting means for positioning said turns, shielding means carried by said supporting means and comprising two strips of sheet metal parallel to the turns and on opposite edges of said winding, respectively, each strip forming an outline corresponding to the contour of the loop and extending across said surface.

10. In a radio compass, a loop comprising a winding and a tuning device, a shield on each face of said loop and comprising a metal member, said members constituting a laminated structure.

In testimony whereof, I have hereunto subscribed my name this first day of February, 1928.

LESTER O. MARSTELLER.